(12) United States Patent
Machida

(10) Patent No.: US 6,822,212 B2
(45) Date of Patent: Nov. 23, 2004

(54) PHOTOELECTRIC DEVICE HAVING NOISE REDUCTION CIRCUITRY

(75) Inventor: Satoshi Machida, Chiba (JP)

(73) Assignee: Seiko Instruments Inc., Chiba (JP)

( * ) Notice: Subject to any disclaimer, the term of this patent is extended or adjusted under 35 U.S.C. 154(b) by 181 days.

(21) Appl. No.: 10/022,677

(22) Filed: Dec. 17, 2001

(65) Prior Publication Data

US 2002/0190188 A1 Dec. 19, 2002

(30) Foreign Application Priority Data

Dec. 28, 2000 (JP) ........................................ 2000-400165

(51) Int. Cl.[7] .............................................. H01L 27/00
(52) U.S. Cl. ................................ 250/208.1; 250/214 A
(58) Field of Search .......................... 250/214 A, 208.1; 348/307, 308, 310, 311, 302, 303, 294, 241, 281, 279.1, 300, 301

(56) References Cited

U.S. PATENT DOCUMENTS

| | | | |
|---|---|---|---|
| 5,175,427 A | * | 12/1992 | Krause ................... 250/214 R |
| 5,898,168 A | * | 4/1999 | Gowda et al. ........... 250/208.1 |
| 6,429,413 B1 | * | 8/2002 | Kawahara et al. ....... 250/208.1 |
| 6,518,558 B1 | * | 2/2003 | Bohm et al. ............. 250/208.1 |
| 6,548,802 B2 | * | 4/2003 | Gurunathan et al. .... 250/214 A |
| 2002/0153475 A1 | * | 10/2002 | Gurunathan et al. .... 250/214 A |

* cited by examiner

Primary Examiner—Thanh X. Luu
(74) Attorney, Agent, or Firm—Brinks Hofer Gilson & Lione

(57) ABSTRACT

A transfer switch is disposed between an output terminal of a photoelectric converter and an input terminal of an amplifier. The input terminal of the amplifier being connected to a reset switch. After accumulation of a light signal of the photoelectric converter, a reference signal held at the input terminal of the amplifier is read from the output terminal of the amplifier, the transfer switch is turned on to transfer light signal charge of the photoelectric converter to the input terminal of the amplifier, after the transfer switch is turned off, a light signal held at the input terminal of the amplifier is read from the output terminal of the amplifier as a light signal, the transfer switch and the reset switch are turned on to reset the output terminal of the photoelectric converter and the input terminal of the amplifier, and after the reset switch is turned off, the transfer switch is turned off.

4 Claims, 6 Drawing Sheets

PHOTOELECTRIC DEVICE HAVING NOISE REDUCTION CIRCUITRY

BACKGROUND OF THE INVENTION

The present invention relates to a photoelectric converter for receiving light impinging on an original image and reflected therefrom and for converting the light into an electric signal. In particular, the present invention relates to a linear image sensor suitable for an image reading apparatus such as a facsimile and an image scanner.

FIG. 6 shows a circuit diagram of an image sensor IC used in a conventional image reading apparatus, and FIG. 7 shows a timing chart. The image sensor is described in Japanese Patent Application Laid-open No. Hei 10-051164.

An N-type region of a photodiode 101 is connected to a positive power source voltage terminal VDD, and a P-type region of the photodiode 101 is connected to a drain of a reset switch 102 and a gate of a source follower amplifier 103. A source of the reset switch 102 is supplied with a reference voltage VREF1. A source of the source follower amplifier 103, which is an output terminal, is connected to a reading switch 105 and a constant current source 104. A gate of the constant current source 104 is supplied with a constant voltage of a reference voltage VREFA, the drain is grounded, and the source is connected with VDD. The drain of the reading switch 105 is connected with the source of the source follower amplifier 103 and the source of the reading switch 105 is connected with a common signal line 106. Elements in a frame of a photoelectric conversion block An shown in FIG. 6 are provided in a number corresponding to pixels. The photoelectric block An represents a photoelectric block in an n-th bit.

The common signal line 106 is input to an inversion terminal of an operational amplifier 109 through a resistor 110 and is grounded by a capacitor 108. An output terminal of the operational amplifier 109 is connected to an output terminal 116 through a chip selecting switch 112 and a capacitor 113. The common signal line 106 is connected to a signal line reset switch 107, and a source of the signal line reset switch 107 is supplied with a reference voltage VREF2. A resistor 111 is connected between an output terminal of the operational amplifier 109 and the inversion terminal thereof. A non-inversion terminal of the operational amplifier 109 is fixed at a constant voltage VREF3. The operational amplifier 109, and the resistors 110 and 111 constitute an inversion amplifier D.

An output terminal 116 of an image sensor is connected to a drain of a MOS transistor 114, and a source of the MOS transistor 114 is supplied with a reference voltage VREF4. The output terminal 116 of the image sensor is also connected to a capacitor 115 such as a parasitic capacitor. The capacitors 113 and 115, and the MOS transistor 114 constitute a clamping circuit C.

In the image sensor with the above-mentioned configuration, after light is reflected from the original image and received, electric charge accumulates on the photodiode, producing a light signal voltage. The light signal voltage is then read from the photodiode and the photodiode is reset. In another step, a reference voltage is read, and a difference between the light signal voltage and the reference voltage is obtained. Therefore, reset noise contained in the reference voltage is different from that in the light signal voltage. More specifically, reset noise at different timings is compared, so that random noise is rather large. Furthermore, since the read of a reference voltage, reset of a photodiode, and read of a light signal voltage are conducted successively in each bit, high-speed read is difficult.

SUMMARY OF THE INVENTION

Therefore, with the foregoing in mind, it is an object of the present invention to provide a photoelectric converter that realizes high-speed read while reducing random noise.

In order to solve the above-mentioned problem of the prior art, a photoelectric converter includes charge transfer circuit between an output terminal of photoelectric converter and an input terminal of an amplifier, the input terminal of the amplifier being connected to a reset circuit, wherein after accumulation of a light signal of the photoelectric converter, a reference signal held at the input terminal of the amplifier is read from the output terminal of the amplifier, the charge transfer circuit is turned on to transfer light signal charge of the photoelectric converter to the input terminal of the amplifier, after the charge transfer circuit is turned off, a light signal held at the input terminal of the amplifier is read from the output terminal of the amplifier as a light signal, the charge transfer circuit and the reset circuit are turned on to reset the output terminal of the photoelectric converter and the input terminal of the amplifier, and after the reset circuit is turned off, the charge transfer circuit is turned off, whereby subsequent accumulation of a light signal is conducted.

Alternatively, a photoelectric converter includes charge transfer circuit between an output terminal of photoelectric converter and an input terminal of amplifier, the output terminal of the photoelectric converter being connected to a reset circuit, wherein after accumulation of a light signal of the photoelectric converter, a reference signal held at the input terminal of the amplifier is read from the output terminal of the amplifier, the charge transfer circuit is turned on to transfer light signal charge of the photoelectric converter to the input terminal of the amplifier, after the charge transfer circuit is turned off, a light signal held at the input terminal of the amplifier is read from the output terminal of the amplifier as a light signal, the charge transfer circuit and the reset circuit are turned on to reset the output terminal of the photoelectric converter and the input terminal of the amplifier, and after the reset means is turned off, the charge transfer circuit is turned off, whereby subsequent accumulation of a light signal is conducted.

Alternatively, there is provided a photoelectric converter for outputting a reference signal and a light signal from a photoelectric converting portion through an amplifier, wherein the reference signal is transferred to reference signal holding circuit through reference signal transfer circuit, the light signal is transferred to light signal holding circuit through light signal transfer circuit, the reference signal holding circuit is connected to an input terminal of a second amplifier through second reference signal transfer circuit, the light signal holding circuit is connected to an input terminal of the second amplifier through second light signal transfer circuit, during a signal reading period, the second light signal transfer circuit is turned onto transfer the light signal held at the light signal holding circuit to the input terminal of the second amplifier, a light signal output is read from an output terminal of the second amplifier, after the second light signal transfer circuit is turned off or at the same time when the second light signal transfer circuit is turned off, the second reference signal transfer circuit is turned on to transfer the reference signal held at the reference signal holding circuit to the input terminal of the second amplifier, and a reference signal output is read from the output terminal of the second amplifier.

According to the above-mentioned reading method, a reference voltage and a light signal voltage containing the same OFF noise of a reset switch are read successively. Therefore, if a difference between the voltages is amplified, a photoelectric converter in which not only fixed pattern noise but also random noise is small can be obtained. Furthermore, since a reference voltage and a light signal voltage can be temporary read to separate capacitors, simultaneously with respect to all the bits, this operation can be made slower. Thus, the area of a circuit to be read can be decreased. Furthermore, a light signal voltage and a reference voltage are read from the capacitor successively in the order of bits through a source follower amplifier. Therefore, high-speed read can be conducted without a reset period.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative embodiments with reference to the drawings.

Figure 1:
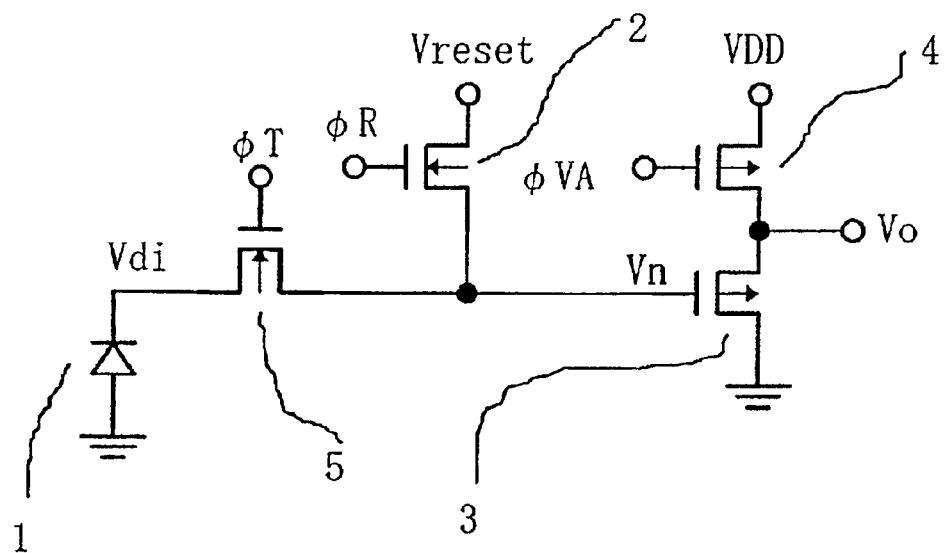
FIG. 1 is a circuit diagram of one bit of a photoelectric converter of the first embodiment according to the present invention.

FIG. 1 is a circuit diagram of one bit of a photoelectric converter of the first embodiment according to the present invention.

A circuit shown in FIG. 1 is composed of a photodiode 1 that functions as photoelectric converter, a transfer switch 5 that functions as charge transfer circuit, a reset switch 2 that functions as reset circuit, a MOS transistor 3 constituting a MOS source follower amplifier that functions as amplifier, and a MOS transistor 4 that functions as a current source.

Figure 2:
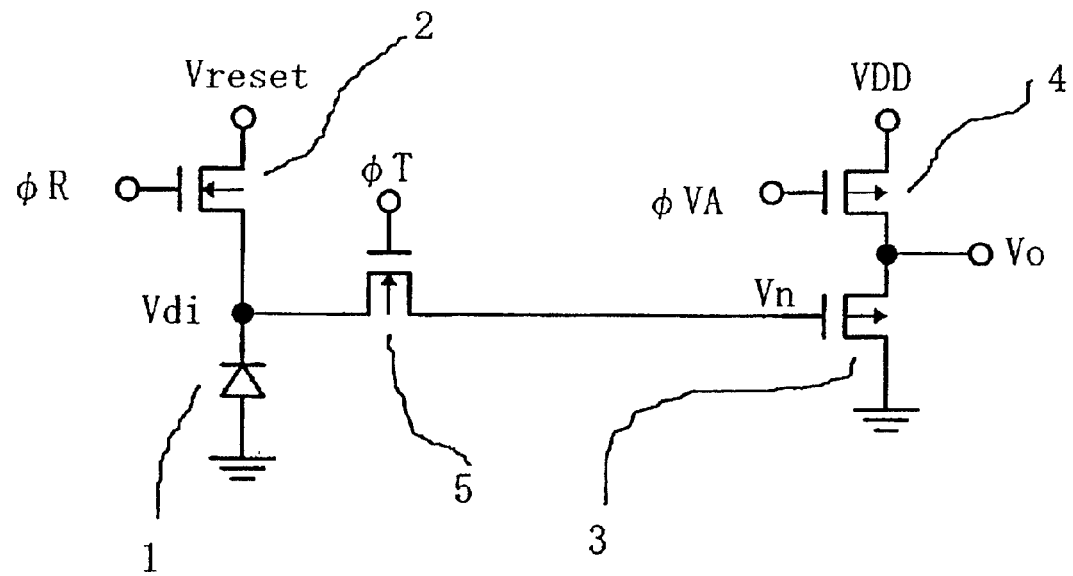
FIG. 2 is a circuit diagram of one bit of a photoelectric converter of the second embodiment according to the present invention.

FIG. 2 is a circuit diagram of one bit of a photoelectric converter of the second embodiment according to the present invention. The circuit diagram shown in FIG. 2 is the same as that in FIG. 1, except for the connecting portion of the reset switch 2.

In FIG. 1 or 2, when a substrate potential of the MOS transistor 3 is commonly set to Vo, it is effectively possible to set the gain of the source follower amplifier to 1.

Figure 3:
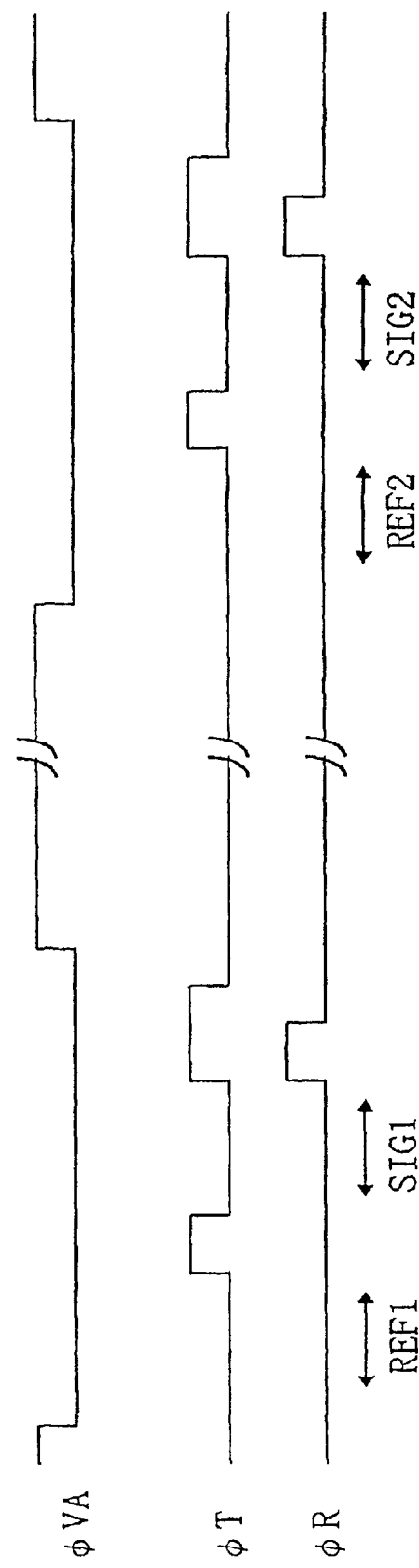
FIG. 3 is a timing chart that is common to the photoelectric converters of the first and second embodiments according to the present.

FIG. 3 is a timing chart common to the photoelectric converters of the first and second embodiments according to the present invention.

Hereinafter, the operation and the configuration of the present embodiments will be described with reference to the timing chart.

First, when a start pulse (not shown) is input, $\phi$VA decreases from VDD to a voltage at which the MOS transistor 4 is operated in saturation. Because of this, a current flows through the MOS transistor 3, whereby the MOS source follower circuit is operated. The gate of the MOS transistor 5, which links the photodiode 1 and the output MOS transistors 3 and 4, is controlled by signal $\phi$T. The reset MOS transistor 2 and the output MOS transistor 4 are controlled by application of signals $\phi$R and $\phi$VA to the respective gates.

Then, during a period REF1, a reference voltage corresponding to the potential of a terminal Vn is output as a reference output from a terminal Vo. When $\phi$T is turned on, the transfer switch 5 is turned on, and charge accumulated in the N-region of the diode is transferred to the terminal Vn. As a result, potentials at a terminal Vdi and the terminal Vn become equal to each other. Next, $\phi$T is turned off, and the terminal Vn is supplied with a potential containing OFF noise thereof. During a period SIG1, a signal voltage corresponding to the potential at the terminal Vn (now equal to the transferred voltage from Vdi) is output as a signal output from the terminal Vo.

Subsequently, $\phi$T and $\phi$R are turned on, and the potentials at Vdi and Vn are reset to Vreset. The timing of activation of the MOS transistors 2 and 5 is not extremely important at this time; either one of $\phi$T and $\phi$R may be turned on first or $\phi$T and $\phi$R may be turned on essentially simultaneously. When $\phi$R is turned off, the terminals Vdi and Vn are supplied with a potential containing OFF noise thereof. When $\phi$T is turned off, the terminals Vdi and Vn are supplied with a potential containing OFF noise thereof.

After $\phi$T is turned off, an accumulation state is attained in the photodiode 1. The accumulation state continues until $\phi$T is turned on. When an electromagnetic wave is incident upon the photodiode 1 during this accumulation period, photoelectric conversion occurs, and the potential at the terminal Vdi decreases. However, if there is no appreciable leakage current at a junction portion of the terminal Vn, and photoelectric conversion does not occur, the potential at the terminal Vn does not change after $\phi$T is turned off. To decrease the amount of undesired voltage change, the junction portion of the terminal Vn of the MOS transistor 5 and the periphery thereof are light-shielded with an opaque layer, for example, a metal such as Al, photoelectric conversion will not occur at this junction portion. The opaque layer also reduces the leakage current at this junction portion. Consequently, the potential at the terminal Vn during the next reference period of REF2 remains essentially constant. The reference voltage corresponding to the potential at the terminal Vn is output as a reference output from the terminal Vo during the period REF2. Thereafter, the above-described operation to extract the signal is repeated during the next signal period SIG2.

Next, output voltages read from the terminal Vo during a period REF2 and a period SIG2 are compared. In the case where, during the accumulation period, an electromagnetic wave is not incident upon the photodiode 1, and there is no leakage at the junction portion of the photodiode 1, the output voltages during the period REF2 and the period SIG2 are equal to each other. This is because the potentials at the terminals Vdi and Vn during the accumulation period do not change, and the potentials at the terminals Vdi and Vn after $\phi$T is turned on/off after the period REF2 do not change, compared with those during the accumulation period. More specifically, before the accumulation period, φR is first turned off, and φT is turned off under the condition that OFF noise of φR is applied to the terminals Vdi and Vn. Even if φT is turned on/off after the period REF2, the total charge at the terminals Vdi and Vn is retained, and the potentials at the terminals Vdi and Vn do not change, compared with the potentials at the terminals Vdi and Vn after φT is turned off before the accumulation period.

When an electromagnetic wave is incident upon the photodiode 1 during the accumulation period, only the potential at the terminal Vdi decreases during the accumulation period, and a part of a change amount at the terminal Vdi changes the potential at the terminal Vn due to the activation of φT after the period REF2. Therefore, an output from the terminal Vo during the period SIG2 decreases. The difference between REF2 and SIG2 corresponds to an output of light incidence.

If the difference between the output voltage from the terminal Vo during the period REF2 and that during the period SIG2 is obtained by a circuit for correlation double sampling, etc., an output proportional to the light amount during the accumulation period can be obtained at a dark output of 0. Furthermore, according to this method, the terminal Vn during the periods REF2 and SIG2 is supplied with the same reset noise as that generated when φR is turned off before the accumulation period. Therefore, an output with small random noise can be obtained.

Figure 4:
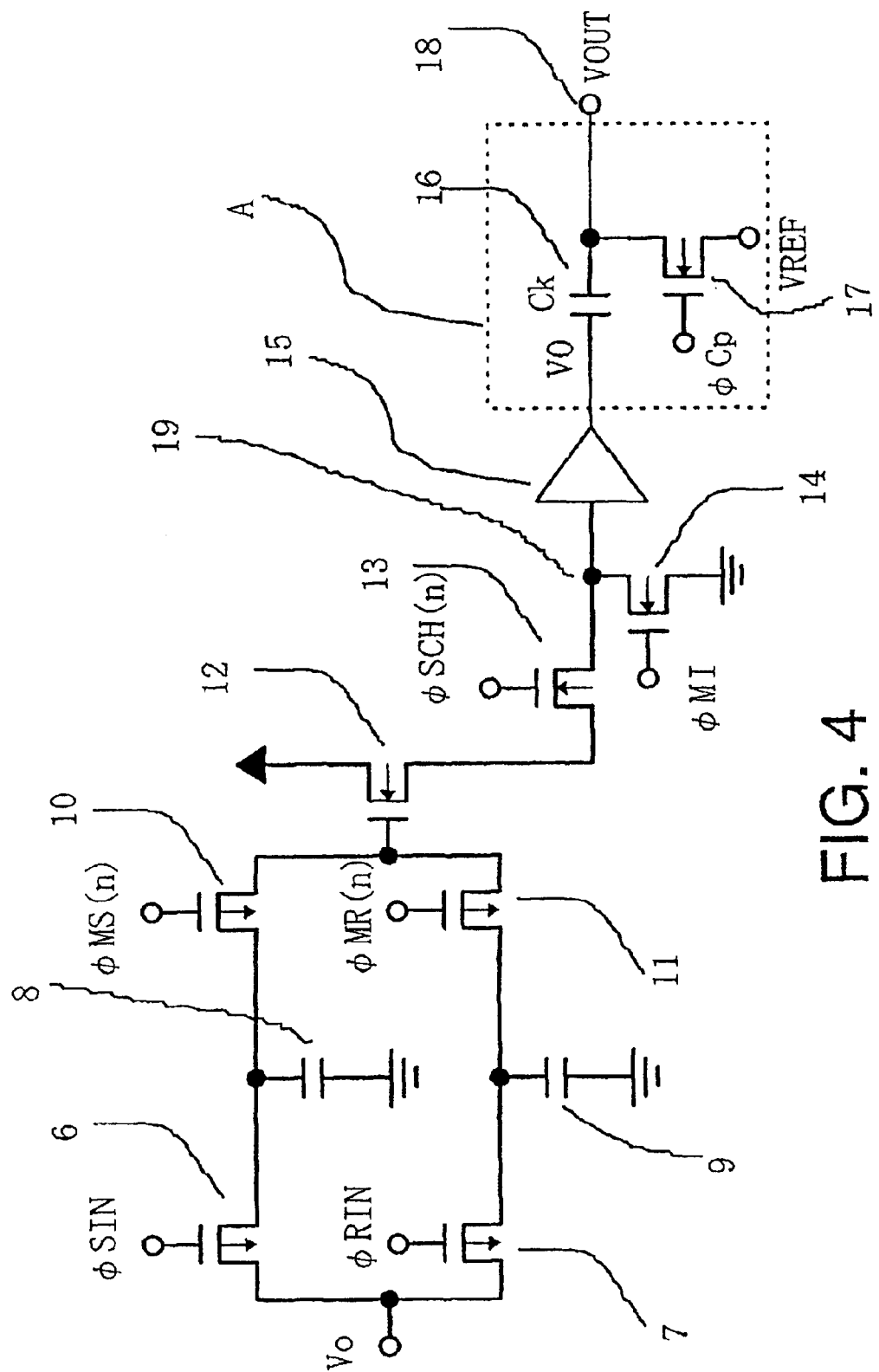
FIG. 4 is a circuit diagram of a photoelectric converter of the third embodiment according to the present invention.
Figure 5:
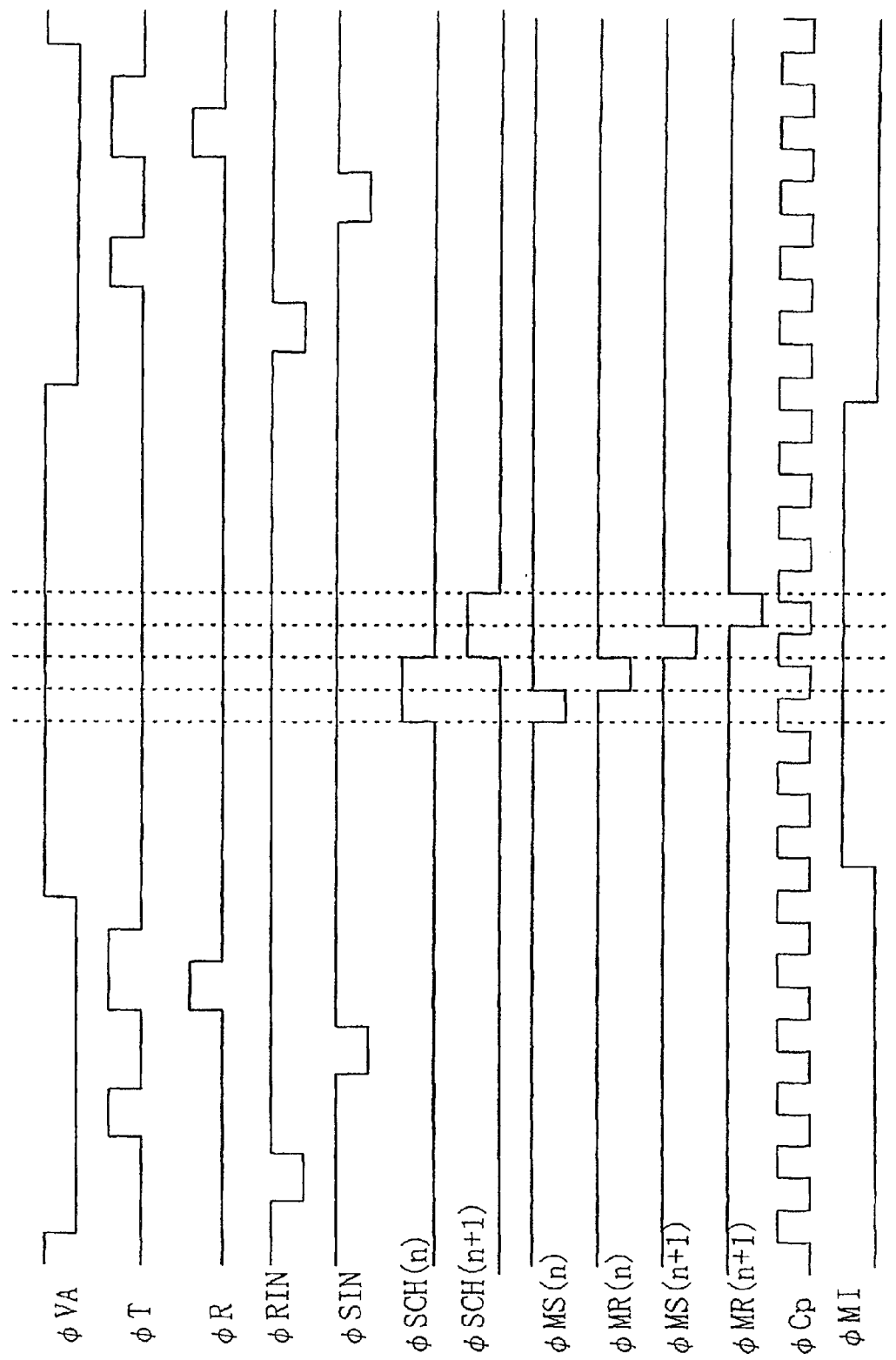
FIG. 5 is a timing chart of the photoelectric converter of the third embodiment according to the present invention.

FIG. 4 shows a circuit diagram of a photoelectric converter of the third embodiment according to the present invention. This shows an example of the above-mentioned method for reading an output voltage from the terminal Vo in FIG. 1 or 2. The terminal Vo in FIG. 1 or 2 is connected to a terminal Vo in FIG. 4. FIG. 5 shows a timing chart in FIG. 4. In the case of a linear sensor, circuits from the terminal Vo to a reading MOS transistor 13 are formed in the number of bits, and a drain of each reading MOS transistor 13 is connected to a common signal line 19. A MOS transistor 12, a reading MOS transistor 13, and a constant current source 14 constitute a source follower amplifier, whose output is input to an amplifier 15. As the amplifier 15, a gain amplifier, a voltage follower amplifier, or the like is used. The output of the amplifier 15 is input to a clamping circuit A constituted by a capacitor 16 and a reset transistor 17, and an output voltage VOUT is output from an output terminal 18 of the clamping circuit A.

First, a charge transfer operation will be described.

During periods REF1 and REF2 in FIG. 3, φRIN is set to be low, and a MOS transistor 7 that functions as reference signal transfer circuit is turned on. During periods SIG1 and SIG2, φSIN is set to be low, and a MOS transistor 6 that functions as light signal transfer circuit is turned on. The output voltage from the terminal Vo during the periods REF1 and REF2 are accumulated at a reference voltage holding capacitor 9 that functions as reference signal holding circuit through the MOS transistor 7. During the periods SIG1 and SIG2, the output voltage from the terminal Vo is accumulated at the light signal voltage holding capacitor 8 that functions as light signal holding circuit through the MOS transistor 6.

Next, a read operation will be described.

The voltages accumulated at the reference voltage holding capacitor 9 and the light signal voltage holding capacitor 8 can be read serially on the bit basis, under the condition that φMI is supplied with a voltage at which the MOS transistor 14 is operated in saturation.

The above-mentioned read is conducted as follows. φSCH(n) is turned high, and φMS(n) is turned low, whereby a reading switch 13 at an n-th bit and a light signal voltage reading switch 10 that functions as second light signal transfer means are turned on. Then, a voltage at the light signal voltage holding capacitor 8 is guided to a gate of the MOS transistor 12 that functions as a second amplifier, and an output voltage in accordance with the voltage is input to the amplifier 15 through the common signal line 19 as a signal voltage. After φMS(n) is turned high, and the MOS transistor 10 is turned off, φMR(n) is turned low, whereby the MOS transistor 11 that functions as second reference signal transfer circuit is turned on. Then, a voltage at the reference voltage holding capacitor 9 is guided to a gate of the MOS transistor 12, and an output voltage in accordance with the voltage is input to the amplifier 15 through the common signal line 19 as a reference voltage.

According to the configuration shown in FIG. 4, a reference voltage and a signal voltage are read through the MOS source follower amplifier 12. Therefore, a reference voltage and a signal voltage can be made constant irrespective of the capacitance of the common signal line 19.

One reason why φMR(n) is turned low after φMS(n) is turned high or at the same time as when φMS(n) is turned high is that if the MOS transistors 10 and 11 are simultaneously turned on, the charge in the reference voltage holding capacitor 9 flows to the signal voltage holding capacitor 8, and the potential of the reference voltage holding capacitor 9 fluctuates. In this case, a reference voltage that is different from the original reference voltage is input to the amplifier 15.

Then, φSCH(n) is turned low, and φMR(n) is turned high, whereby read at an n-th bit is completed. Shortly thereafter, φSCH(n+1) is turned high, and φMS(n) is turned low, whereby read of a signal voltage at a (n+1)-th bit is started. Thereafter, similarly, bits are switched, and signal voltages and reference voltages of all the bits are serially read.

Thereafter, φMI is turned low, and a current source 14 is turned off for the purpose of eliminating an unwanted consumption current. Then, φVA decreases from VDD to a voltage at which the MOS transistor 4 is operated in saturation. Because of this, the MOS source follower circuit constituted by the MOS transistor 3 is operated, and a subsequent charge transfer operation is started.

The clamping circuit clamps a voltage at the output terminal 18 at VREF when φCp is high, and outputs a difference between the signal voltage and the reference voltage for each bit to the output terminal 18 based on VREF when φCp is low. According to this method, offset of the MOS transistors 3 and 12 of each bit is cancelled, and an output signal without containing fixed pattern noise between bits can be obtained.

Furthermore, as described above, the order of reading on the bit basis should be set in such that a signal voltage is read first, and then a reference voltage is read. The reason for this is as follows. In a gate capacitance of the MOS transistor 12, the previously read charge remains. If a reference voltage is first and then a signal voltage is read in each bit, charge of the signal voltage remains in a gate capacitance of the MOS transistor 12. This charge is added to a reference voltage in the subsequent cycle, which causes a residual image. In contrast, if a signal voltage is read first and then a reference voltage is read in each bit, charge of the reference voltage remains in a gate capacitance of the MOS transistor 12. This charge is the same as the reference voltage in the subsequent cycle, so that a residual image is not generated. When the reference voltage is read, charge of the signal voltage remaining in the gate capacitance of the MOS transistor 12 is added, and the reference voltage is decreased by this added charge. This decreases sensitivity. Therefore, the capacitances of the reference voltage holding capacitor 9 and the signal voltage holding capacitor 8 should be sufficiently larger than that of the gate capacitance of the MOS transistor 12.

Figure 6:
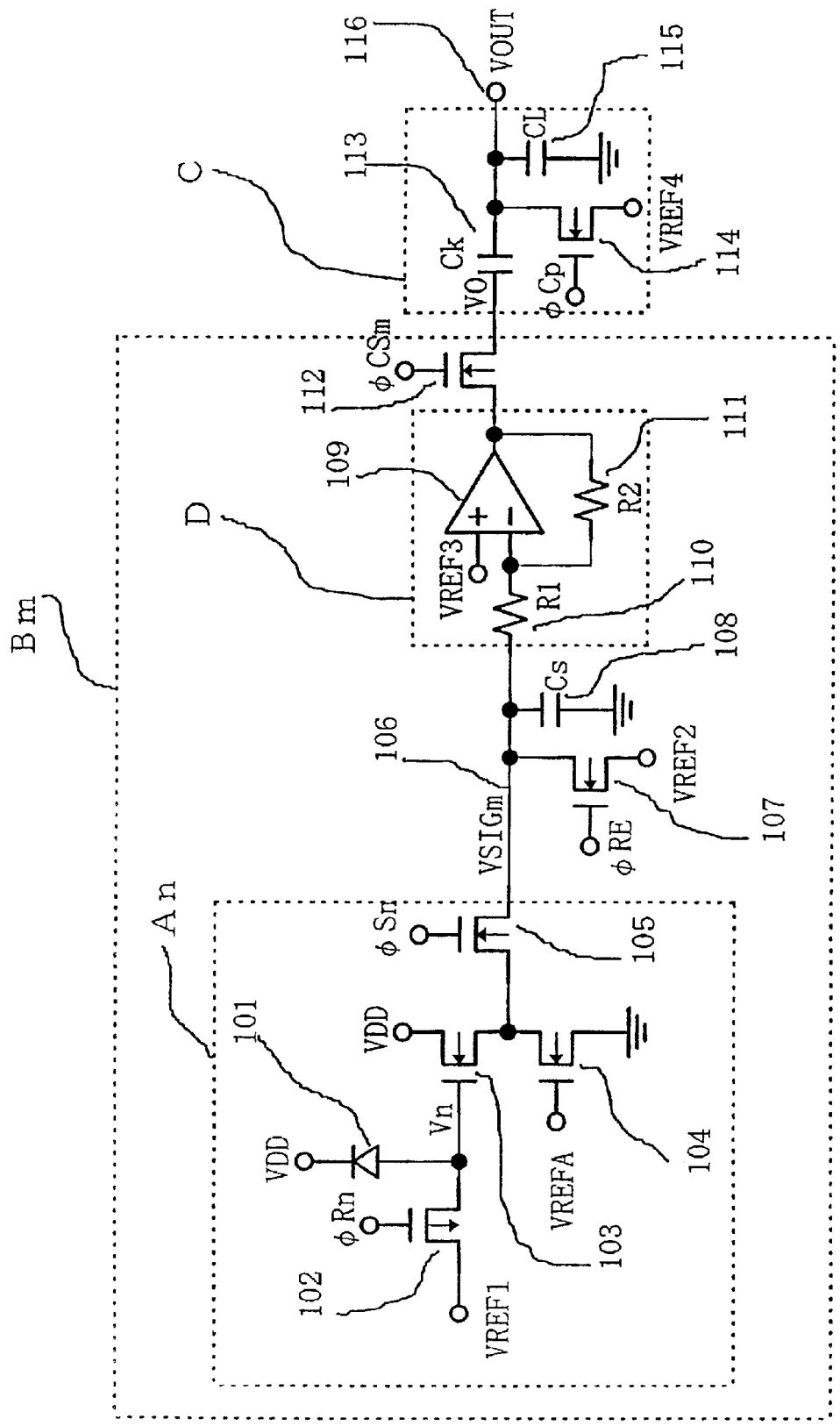
FIG. 6 is a circuit diagram of an image sensor IC used in a conventional image reading apparatus.
Figure 7:
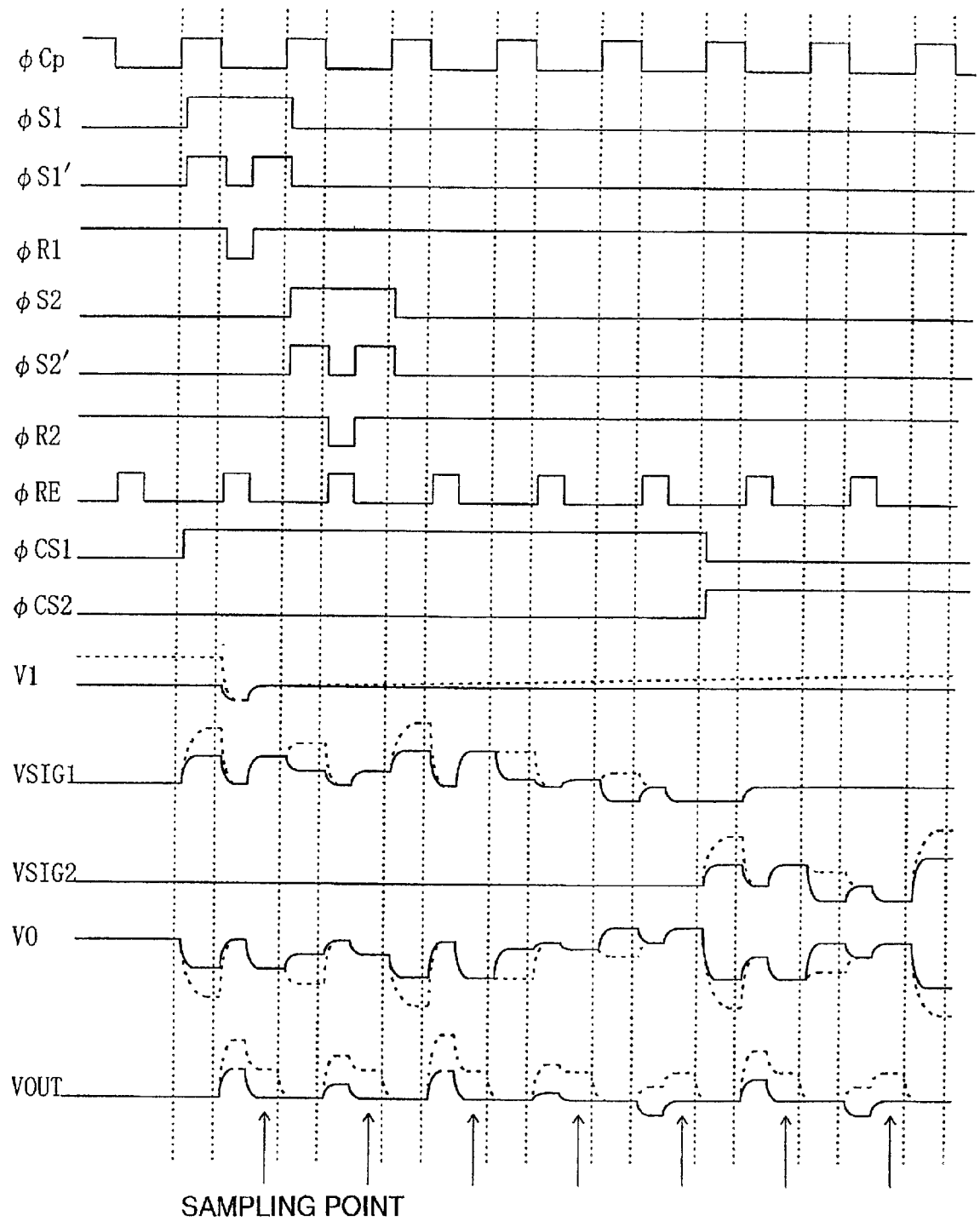
FIG. 7 is a timing chart of an image sensor IC used in a conventional image reading apparatus.

In the above description, the terminal Vo in FIG. 1 or 2 is connected to the terminal Vo in FIG. 4. However, the source of the MOS transistor 103 that functions as a source follower amplifier in FIG. 6 may also be connected to the terminal Vo in FIG. 4. In this case, the charge transfer operation may be conducted as follows: φSIN is turned on to transfer a light signal voltage, φRn in FIG. 6 is turned on after φSIN is turned off, thereby resetting Vn, and φRIN is turned on after φRn is turned off, thereby transferring a reference voltage.

The present invention is not restricted to above-described embodiments, and can be variously modified without departing the scope of the present invention.

It is possible to form the above-mentioned circuit on one semiconductor substrate to provide a linear image sensor. Furthermore, a plurality of linear image sensor ICs may be mounted in a line to provide a contact-type image sensor.

As described above, according to the present invention, a light signal voltage and a reference voltage containing the same OFF noise of the reset switch are read, so that a photoelectric converter in which both a small fixed pattern noise and a small random noise can be obtained. Furthermore, since a reference voltage and a light signal voltage can be read to separate capacitors, simultaneously with respect to all the bits, this operation can be made slower. Thus, the area of a circuit to be read can be decreased. Furthermore, a light signal voltage and a reference voltage are read from the capacitor successively in the order of bits through a source follower amplifier. Therefore, high-speed read can be conducted without a reset period.

Accordingly, with a simple configuration, an image sensor IC that is read at high speed can be provided in which a residual image is not generated and variations in a dark output are small. Furthermore, a contact image sensor can be provided in which a plurality of image sensor ICs are mounted in a line.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A photoelectric device, comprising:
   a photoelectric converter;
   an amplifier;
   a reset circuit;
   a charge transfer circuit being interposed between an output terminal of the photoelectric converter and an input terminal of the amplifier; and
   a reset circuit being connected to the input terminal of the amplifier,
   wherein a reference signal held at the input terminal of the amplifier is read from an output terminal of the amplifier after charge accumulation under a light on the photoelectric converter, then the charge transfer circuit is turned on so that the accumulated charges on the photoelectric converter are transferred to the input terminal of the amplifier, the charge transfer circuit is then turned off, the transferred charges held at the input terminal of the amplifier are read from the output terminal of the amplifier as a light signal, then the charge transfer circuit and the reset circuit are both turned on so that the output terminal of the photoelectric converter and the input terminal of the amplifier are both, set to a reset voltage, and then the charge transfer circuit is turned off after the reset circuit is turned off, whereby subsequent charge accumulation under a light on the photoelectric converter is conducted.

2. A photoelectric device according to claim 1, further comprising:
   a reference signal transfer circuit;
   a reference signal holding circuit, the reference signal being transferred from the output terminal of the amplifier through the reference signal transfer circuit to the reference signal holding circuit;
   a light signal transfer circuit;
   a light signal holding circuit, the light signal being transferred from the output terminal of the amplifier through the light signal transfer circuit to the light signal holding circuit;
   a second reference signal transfer circuit;
   a second light signal transfer circuit; and
   a second amplifier having an input terminal connected with the reference signal holding circuit through the second reference signal transfer circuit and connected with the light signal holding circuit through the second light signal transfer circuit;
   wherein during a signal reading period, the second light signal transfer circuit is turned on so that the light signal held at the light signal holding circuit is transferred to the input terminal of the second amplifier, a light signal output is read from an output terminal of the second amplifier, the second reference signal transfer circuit is turned on not earlier than when the second light signal transfer circuit is turned on so that the reference signal held at the reference signal holding circuit is transferred to the input terminal of the second amplifier, and a reference signal output is read from the output terminal of the second amplifier.

3. A photoelectric device comprising:
   a photoelectric converter;
   an amplifier;
   a reset circuit;
   a charge transfer circuit being interposed between an output terminal of the photoelectric converter and an input terminal of amplifier; and
   a reset circuit being connected to the output terminal of the photoelectric converter,
   wherein a reference signal held at the input terminal of the amplifier is read from an output terminal of the amplifier after charge accumulation under a light on the photoelectric converter, then the charge transfer circuit is turned on so that the accumulated charges on the photoelectric converter are transferred to the input terminal of the amplifier, the charge transfer circuit is then turned off, the transferred charges held at the input terminal of the amplifier are read from the output terminal of the amplifier as a light signal, then the charge transfer circuit and the reset circuit are both turned on so that the output terminal of the photoelectric converter and the input terminal of the amplifier are both set to a reset voltage, and then the charge transfer circuit is turned off after the reset circuit is turned off, whereby subsequent charge accumulation under a light on the photoelectric converter is conducted.

4. A photoelectric device according to claim 3, further comprising:

a reference signal transfer circuit;

a reference signal holding circuit, the reference signal being transferred from the output terminal of the amplifier through the reference signal transfer circuit to the reference signal holding circuit;

a light signal transfer circuit;

a light signal holding circuit, the light signal being transferred from the output terminal of the amplifier through the light signal transfer circuit to the light signal holding circuit;

a second reference signal transfer circuit;

a second light signal transfer circuit; and a second amplifier having an input terminal connected with the reference signal holding circuit through the second reference signal transfer circuit and connected with the light signal holding circuit through the second, light signal transfer circuit;

wherein during a signal reading period, the second light signal transfer circuit is turned on so that the light signal held at the light signal holding circuit is transferred to the input terminal of the second amplifier, a light signal output is read from an output terminal of the second amplifier, the second reference signal transfer circuit is turned on not earlier than when the second light signal transfer circuit is turned on so that the reference signal held at the reference signal holding circuit is transferred to the input terminal of the second amplifier, and a reference signal output is read from the output terminal of the second amplifier.

* * * * *